June 11, 1963   F. A. PICARD   3,093,210
SIGHTSEEING CAR
Filed Nov. 27, 1961

3,093,210
SIGHTSEEING CAR
Fred A. Picard, Boite Postale 8, Champel,
Geneva, Switzerland
Filed Nov. 27, 1961, Ser. No. 155,071
Claims priority, application Switzerland Nov. 25, 1960
1 Claim. (Cl. 187—9)

The present invention relates to sightseeing equipment, in particular to a sightseeing car adapted for circulating in exhibitions, factory yards, amusement grounds, parks, etc.

Heretofore, small trains have been used for this purpose, consisting of a traction engine and several trailers. Such rail or road trains are relatively expensive when compared with the number of persons they can transport. Moreover, such vehicles, as well as other circulating vehicles or persons are exposed to an increased accident risk, as the conductor is not in a position to pay attention simultaneously to the head-on and backward traffic.

It is an object of the invention to provide a vehicle including a platform for taking-up passengers, which platform may be lifted from a lower position adjacent to the ground for embarking and disembarking passengers to a raised travelling position.

The novel features of the invention together with further of its objects and advantages will become apparent from a preferred embodiment thereof shown in the accompanying drawing and described in the following specification.

Figures 1, 2:
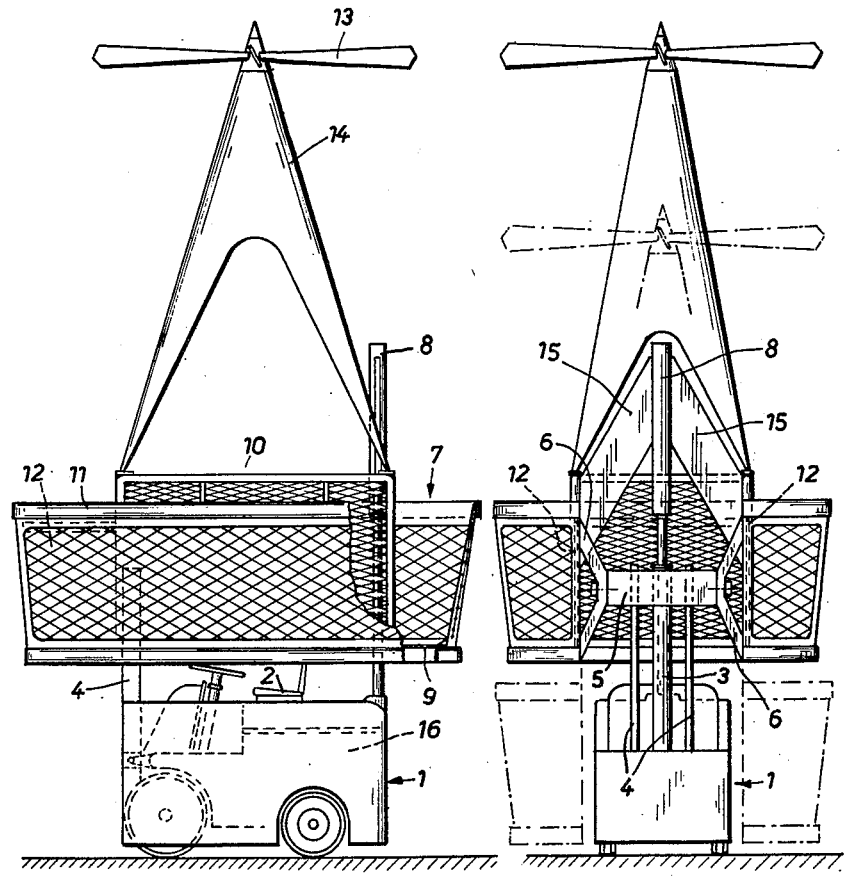
FIGURE 1 is a side view of a sightseeing vehicle according to the invention.
FIGURE 2 is a front view of the vehicle.
Figure 3:
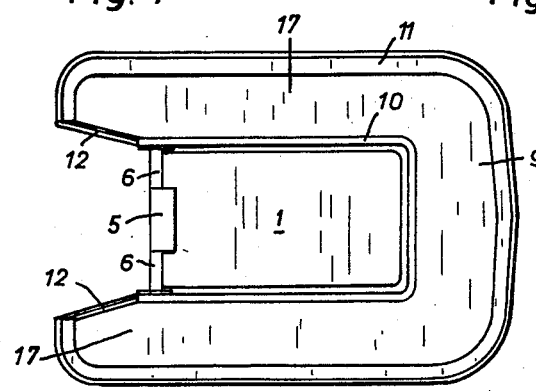
FIGURE 3 is a top plan view of the passenger platform.

With reference to the drawing, the chassis of the sightseeing car according to the invention is formed by a conventional industrial stacking or lifting truck 1 such as is used for internal shop traffic. Such trucks are provided with a power unit generally indicated by 16 and with a driver's seat 2. The driver controls from his seat the forward and backward movement, the travelling direction and the lifting mechanism which usually includes a hydraulically operated ram 3 and a hoisting slide 5 actuated by the ram 3 and guided by vertical guide rails 4. The slide 5 usually carries a forked member which supports the load to be lifted. In the present case the forked member has been dismantled and supporting brackets 6 are fixed to both sides of the slide 5. These brackets carry the forward end of a passenger platform 7 of U-shape. The two branches 17 of the platform extend in the travelling direction of the truck 1 along both lateral walls as indicated in dash-and-dot lines in FIGURE 2. A second lifting ram 8 is connected with the rear portion of the platform which can be raised by means of the two lifting rams 3 and 8 from the position adjacent the ground shown in dash-and-dot lines to the elevated position shown in full lines in FIGURES 1 and 2.

The passenger platform is provided with a bottom 9 offering to the passengers a U-shaped standing surface. A railing consisting of an inner part 10 and of an outer part 11 encloses the standing surface 9 and forms together with this surface a kind of balcony for the passengers. This balcony is accessible through two doors 12 which are hingedly connected to the end of the inner railing part 10 and extend towards the forward inwardly bent ends of the outer railing 11. These two doors may be locked by a not represented mechanism which is constructed in any way as may easily be recognized by those skilled in the art in such a manner that the doors are locked either by the driver or automatically in response to raising of the passenger platform 7.

A tower 14 having at its upper end a helicopter propeller 13 is fixed to and supported by the top of the inner railing 10. However, this tower has no functional but only structural significance for imparting strength and rigidity, and represents an easily recognizable mark in a great crowd which may be present on exhibition grounds. The second lifting ram 8 is fixed by means of braces 15 to the inner railing, just as the lifting ram 3 is fixed by means of the brackets 6.

After the passengers have entered the lowered platform, the doors 12 are closed and locked and then the platform 7 is raised to its upper position by the hoisting mechanism. The truck then is started and its driver has a free forward view. The passengers enjoy a good view from the raised platform.

The invention offers the further advantage that the trucks which usually only are employed for the erection and the demolition of an exhibition and in the meantime are out of operation, may be thus used throughout the duration of the exhibition. Of course, motor trucks specially built for the purpose of the invention may be advantageous in such cases where a permanent use of the vehicles is possible.

It will be appreciated that the invention is by no means limited to the specific embodiment illustrated and described in detail. Rather the invention should be deemed to be limited only by the scope of the appended claim.

I claim:

A passenger vehicle for sightseeing tours, comprising a chassis, driving means in said chassis, a vertically movable platform for taking up passengers, means for lifting said platform from a lowered to a raised position, said platform being of U-shape having two lateral branches extending along the sides of the chassis with the platform in lowered position and connected by a rear portion at the rear of the chassis, an inner railing extending along the inner edge of the U-shaped platform, an outer railing extending along the outer edge of the platform, and doors provided in said railing, the lifting means for raising the platform being connected to said inner railing.

References Cited in the file of this patent
UNITED STATES PATENTS

| | | |
|---|---|---|
| 1,505 | Penfield | Mar. 3, 1840 |
| 2,379,094 | Maxon | June 26, 1945 |
| 2,412,158 | Kuehlman et al. | Dec. 3, 1946 |
| 2,778,674 | Attendu | Jan. 22, 1957 |
| 2,885,242 | Spatta | May 5, 1959 |
| 3,016,973 | Williamson | Jan. 16, 1962 |

FOREIGN PATENTS

| | | |
|---|---|---|
| 1,004,223 | Germany | Mar. 14, 1957 |
| 1,131,360 | France | Oct. 15, 1956 |